Figures 1, 2:
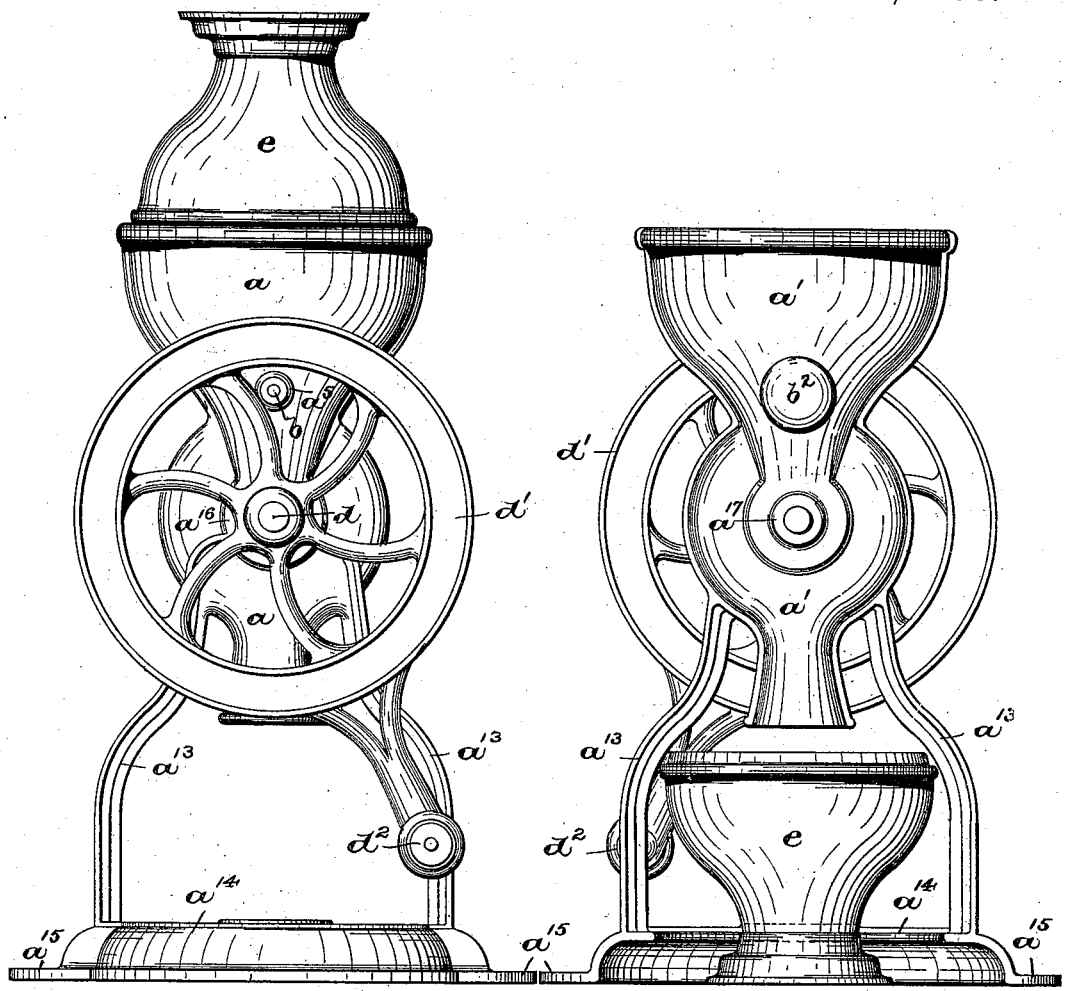

(No Model.) 3 Sheets—Sheet 1.

C. C. CLAWSON.
COFFEE OR SPICE MILL.

No. 599,890. Patented Mar. 1, 1898.

WITNESSES:
Wm. H. Camfield, Jr.
Marcy F. Tisdell

INVENTOR:
CLEMENT C. CLAWSON
BY
Fred C. Fraentzel,
ATTORNEY (No Model.) 3 Sheets—Sheet 2.

C. C. CLAWSON.
COFFEE OR SPICE MILL.

No. 599,890. Patented Mar. 1, 1898.

WITNESSES:

INVENTOR:
CLEMENT C. CLAWSON
BY
Fred C. Fraentzel,
ATTORNEY (No Model.)

3 Sheets—Sheet 3.

C. C. CLAWSON.
COFFEE OR SPICE MILL.

No. 599,890. Patented Mar. 1, 1898.

WITNESSES:

INVENTOR:

CLEMENT C. CLAWSON,

BY

ATTORNEY

UNITED STATES PATENT OFFICE.

CLEMENT C. CLAWSON, OF NEWARK, NEW JERSEY.

COFFEE OR SPICE MILL.

SPECIFICATION forming part of Letters Patent No. 599,890, dated March 1, 1898.

Application filed March 20, 1897. Serial No. 628,416. (No model.)

*To all whom it may concern:*

Be it known that I, CLEMENT C. CLAWSON, a citizen of the United States, residing at Newark, in the county of Essex and State of New Jersey, have invented certain new and useful Improvements in Coffee or Spice Mills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in mills for grinding coffee, spices, or the like; and the primary object of the invention is to provide an improved construction of mill, comprising a pair of adjustable shells having grinding-surfaces, a rotary shaft operating in bearings in said shells, and a pair of runners detachably but operatively arranged on said shaft, said runners being provided with grinding-surfaces, whereby a construction of grinding-mill is the result, the parts of which can be more readily and cheaply made, quickly assembled in operative position upon the shaft, and readily separated for cleaning.

Another object of this invention is to provide a mill of the character hereinabove stated, having separable shells, comprising a hopper at the top and a discharge opening or mouth at the bottom, said shells being separably and adjustably connected, first, for cleaning the inner parts of the mill, and, secondly, for adjusting the parts for coarse or very fine grinding.

The invention therefore consists in the novel construction of mill hereinafter set forth and in the arrangement of the two-part shells, forming when secured together a combined casing for the grinding-runner, a hopper above the same, and a discharge opening or mouth at the bottom; also, in a means for adjustably connecting said shells, and, furthermore, in such novel arrangements and combinations of parts to be hereinafter fully described, and finally embodied in the clauses of the claim.

The invention consists, further, in certain special constructions of parts not hereinabove mentioned, but which will be hereinafter set forth.

The invention is clearly illustrated in the accompanying drawings, in which—

Figure 3:
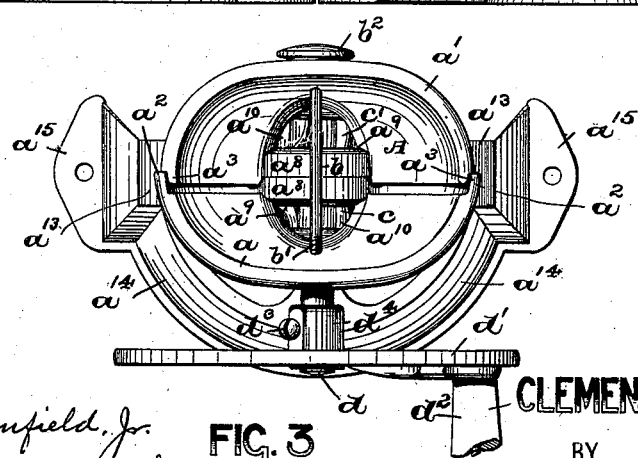
Figure 4:
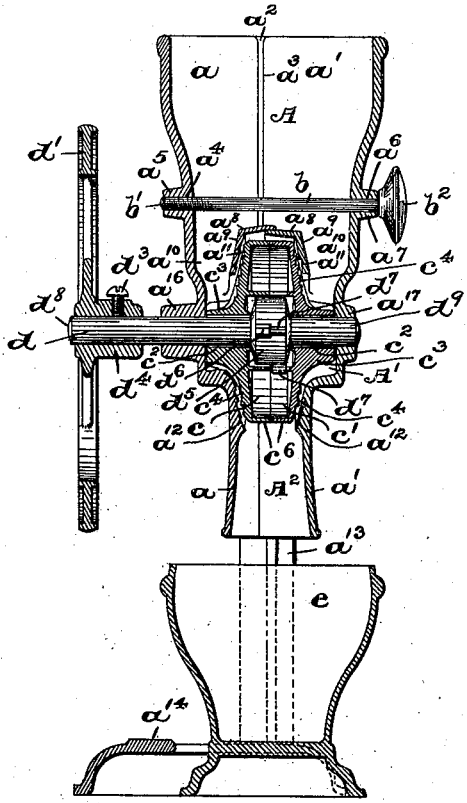
Figure 5:
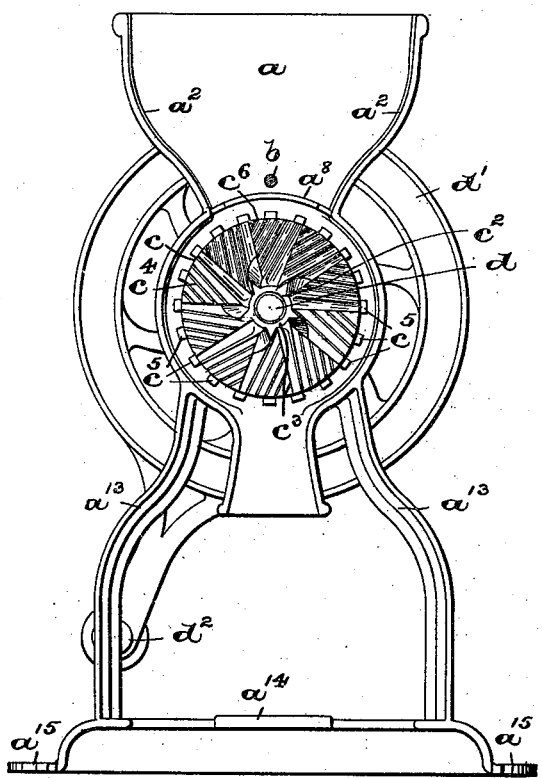
Figure 6:
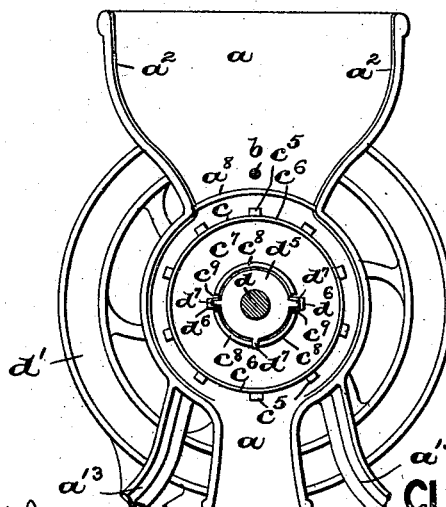
Figures 7, 8:
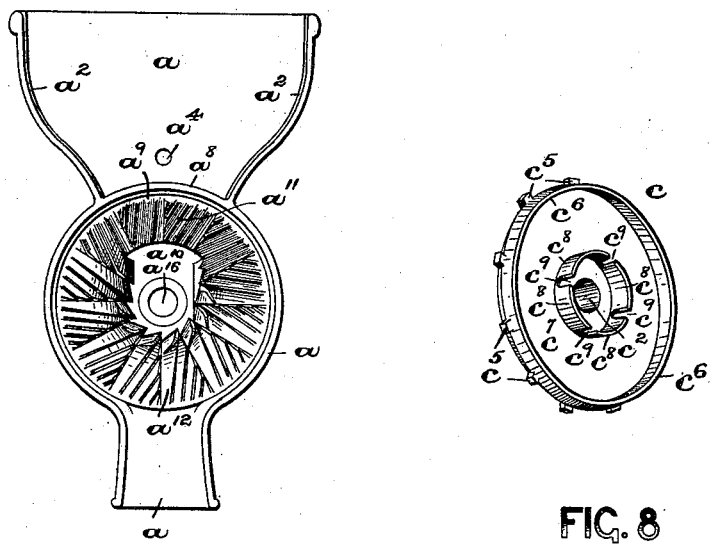
Figure 9:
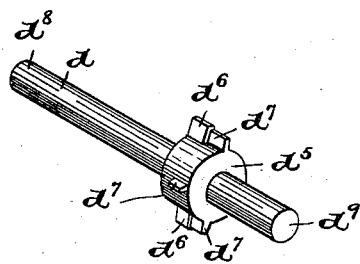

Figure 1 is a front view, Fig. 2 a back view, and Fig. 3 a top view, of a grinding-mill embodying the principles of my present invention. Fig. 4 is a vertical cross-section of the mill. Fig. 5 is a face view of the device with one of the shells removed; and Fig. 6 is a similar view of the upper portion of the mill with one of the shells and one of the grinding-runners removed, the horizontal shaft being represented in cross-section. Fig. 7 is a face view of the inner portion of one of the shells; and Figs. 8 and 9 are perspective views of one of the runners and the shaft, respectively.

Similar letters of reference are employed in all of the above-described views to indicate corresponding parts.

As will be seen from the several figures of the drawings, the mill comprises a pair of shells $a$ and $a'$, of any proper shape and configuration in outline, one of said shells, as $a$, having a recess $a^2$ along its edges, into which extends and is adjustably arranged therein a tongue-like edge $a^3$ of the shell $a'$, as will be more especially seen from Fig. 3. The shell $a$ is provided with a screw-threaded hole $a^4$ and preferably with an enlargement $a^5$, while the shell $a'$ has a correspondingly-arranged hole $a^6$ and is also preferably provided with an enlargement or boss $a^7$. Passing through said hole $a^6$ is an adjusting-screw $b$, having a finger-piece $b^2$ for turning its screw-threaded end $b'$ into the threaded hole $a^4$ in the shell $a$, whereby the two shells $a$ and $a'$ can be secured together edge to edge, as indicated in Figs. 3 and 4, to form the hopper A, the casing A' for the grinding-runners, and the discharge opening or mouth A².

Each shell $a$ and $a'$ is formed with a bridge-piece $a^8$, made to overlap, as shown in Fig. 4, when the two shells are secured together, said pieces $a^8$ being provided with the downwardly-extending portions or walls $a^9$, forming suitable openings $a^{10}$, through which the material to be ground passes down between the grinding-surfaces $a^{11}$, formed on the inner surface of each shell, substantially as illustrated. The inner surfaces of said bridge-pieces $a^8$ are also formed with suitable grinding-surfaces $a^{12}$, substantially as represented in Figs. 4 and 7.

As will be seen from the several figures of the drawings, the shell $a$ is provided with suitable legs $a^{13}$ and a connecting-base $a^{14}$, preferably provided with perforated lugs $a^{15}$, as shown in Fig. 3, for attaching the mill to a table, bench, or the like.

The shell $a$ is provided with a suitable bearing portion $a^{16}$ and the shell $a'$ with a bearing portion $a^{17}$, in which is rotatively arranged an operating-shaft $d$, having a fly-wheel $d'$ and operating-handle $d^2$, secured to said shaft by means of a screw $d^3$, passing in the usual manner through the hub $d^4$ of said fly-wheel, as clearly shown in Figs. 3 and 4. The said shaft $d$ is provided with a suitable hub $d^5$, formed integral with the shaft proper, or it may be made separate therefrom and secured to the shaft in any well-known manner, said hub being provided on its cylindrical surface with outwardly-extending projections or teats $d^6$ and $d^7$, as will be clearly evident. Detachably arranged upon the said hub of the shaft $d$ are a pair of disks $c$ and $c'$, which form the grinder-runners of the mill, said disks being vertically placed upon the shaft $d$ and moving with the same when it is operated. Each grinder-runner has a central perforation or hole $c^2$ and a surrounding hub $c^3$, said runners being also provided with suitably-formed grinding-surfaces $c^4$, substantially as illustrated in Figs. 4 and 5. Upon the circumferential edge of each disk $c$ and $c'$ are suitably-spaced projections or lugs $c^5$ and an annular ledge $c^6$, extending from one side at or near the said edge of the disk. Said lugs $c^5$, when the shaft $d$ is turned to operate the grinding-disks, move in very close proximity to the grinding-surfaces $a^{12}$ and are for the purpose of pushing or forcing the ground material along the annular surfaces $c^6$ of the disks $c$ and $c'$ to prevent the clogging of the ground material in the machine and to force it down into the delivery-opening. Upon the inner surface $c^7$ of each disk are certain projections $c^8$, with intervening spaces $c^9$ formed between them, substantially as illustrated in Fig. 8.

To secure the several parts of the mill together, the disk $c$ is placed upon the hub $d^5$ on the shaft $d$, so that the projections or teats $d^6$ on said hub fit into the spaces $c^9$ between the projections $c^8$ on the disk, and the surface $c^7$ of said disk is snugly fitted against the edge of said projections or teats $d^6$. The end $d^8$ of said shaft $d$ is then pushed through the bearing $a^{16}$ in the shell $a$, and the fly-wheel $d'$ and its operating-handle $d^2$ then secured in operative position upon the said end of the shaft. The other disk $c'$ is then slipped over the end $d^9$ of said shaft $d$, bringing the projections $c^8$ on said disk over the hub $d^5$ and fitting the projections or teats $d^7$ into the spaces $c^9$ between said projections $c^8$ on said disk $c'$, and in this manner both said disks $c$ and $c'$ are operatively, but also detachably, held in position on the said shaft $d$. While in these positions upon the said shaft the annular ledges $c^6$ of both disks are made to abut, as indicated in Fig. 4, and a complete grinding-runner will be the result, as will be clearly evident. The other shell $a'$ of the mill is then placed over the end $d^9$ of the shaft $d$ and its tongue-like edge $a^3$ fitted into the recess $a^2$ of the shell $a$ and then secured in position against the other shell by means of the bolt or rod $b$, hereinabove mentioned, and in the manner previously described. By the use of three or more projections $d^7$ on one part of the hub $d^5$ on the shaft $d$ the one grinding-disk is capable of a rotative adjustment on said hub to bring the lugs $c^5$ on the two disks $c$ and $c'$ either directly opposite one another or to bring them in alternate positions on their respective disks, whereby the spaces between any two consecutive lugs $c^5$ on the ledges $c^6$ of the two disks $c$ and $c'$ may be made larger or smaller, as necessity may demand in grinding different kinds of materials. By tightly screwing up said bolt or rod $b$ the two shells $a$ and $a'$, as well as the disks $c$ and $c'$, are brought close together, whereby the spaces between their respective grinding-surfaces can be made very small to cause the particles of the material to be ground very fine, or by partially unscrewing said bolt or rod $b$ the distances between said grinding-surfaces can be enlarged, and a more coarse grinding of the material will be the result, which can be regulated according to the desire of the operator by turning said screw or bolt in the proper direction. The said bridge-pieces $a^8$ mentioned in the above, which are preferably cast integral with the shells $a$ and $a'$, separate a portion of the hopper A from the casing A', surrounding the grinding-runners, and prevent the material to be ground from getting upon the upper portions of said runners and properly guide the material between the grinding-surfaces of said runners and said shells $a$ and $a'$; but said bridge-pieces, while desirable, are not absolutely necessary.

I may use in connection with my novel construction of mill a suitable cup $e$, which can be placed beneath the discharge opening or mouth of the mill, as indicated in Figs. 2 and 4, or said cup may be placed upon the top of the hopper to serve as a cover for the mill, as clearly illustrated in Fig. 1.

By my novel arrangements and constructions of the parts herein described many advantages are the result, and a simple, useful, and cheap construction of grinding-mill is provided.

Many changes may be made in the arrangements and combinations of parts and the details of construction thereof without departing from the scope of my present invention. Hence I do not limit my present invention to the exact arrangements and combinations of the parts as herein described, and illustrated in the accompanying drawings.

Having thus described my invention, what I claim is—

1. In a grinding-mill, the combination, with the casing thereof, of a shaft, having a boss $d^5$ and teats or projections on said boss, and a grinding-runner, comprising a pair of disks having projections $c^8$ and intervening spaces $c^9$, arranged over said boss $d^5$ and said teats or projections fitting into said spaces, said disks being capable of a rotative adjustment on said boss $d^5$, and lugs $c^5$ on the peripheral surfaces of said disks, substantially as and for the purposes set forth.

2. In a grinding-mill, the combination, with the casing thereof, of a shaft, having a boss $d^5$ and teats or projections on said boss, and a grinding-runner, comprising a pair of disks having projections $c^8$ and intervening spaces $c^9$, arranged over said boss $a^5$ and said teats or projections, fitting into said spaces and holding said disks in lateral sliding engagement with the projections on said boss $d^5$, and said disks having abutting ledges $c^6$, substantially as and for the purposes set forth.

3. In a grinding-mill, the combination, of an adjustable two-part casing, and a screw-threaded rod or bolt connected with said parts of the casing for adjustably securing them together, bearing portions in said parts, a shaft in said bearings, having a boss $d^5$ and teats or projections on said boss, and a grinding-runner, comprising a pair of disks having projections $c^8$ and intervening spaces $c^9$, arranged over said boss $d^5$ and said teats or projections fitting into said spaces, and lugs $c^5$ on the peripheral surfaces of said disks, substantially as and for the purposes set forth.

4. In a grinding-mill, the combination, of an adjustable two-part casing, and a screw-threaded rod or bolt connected with said parts of the casing for adjustably securing them together, bearing portions in said parts, a shaft in said bearings, having a boss $d^5$ and teats or projections on said boss, and a grinding-runner, comprising a pair of disks having projections $c^8$ and intervening spaces $c^9$, arranged over said boss $d^5$ and said teats or projections, fitting into said spaces and holding said disks in lateral sliding engagement with the projections on said boss $d^5$, and said disks having abutting ledges $c^6$, substantially as and for the purposes set forth.

In testimony that I claim the invention set forth above I have hereunto set my hand this 16th day of March, 1897.

CLEMENT C. CLAWSON.

Witnesses:
 FREDK. C. FRAENTZEL,
 WM. C. CAMFIELD, Jr.